UNITED STATES PATENT OFFICE.

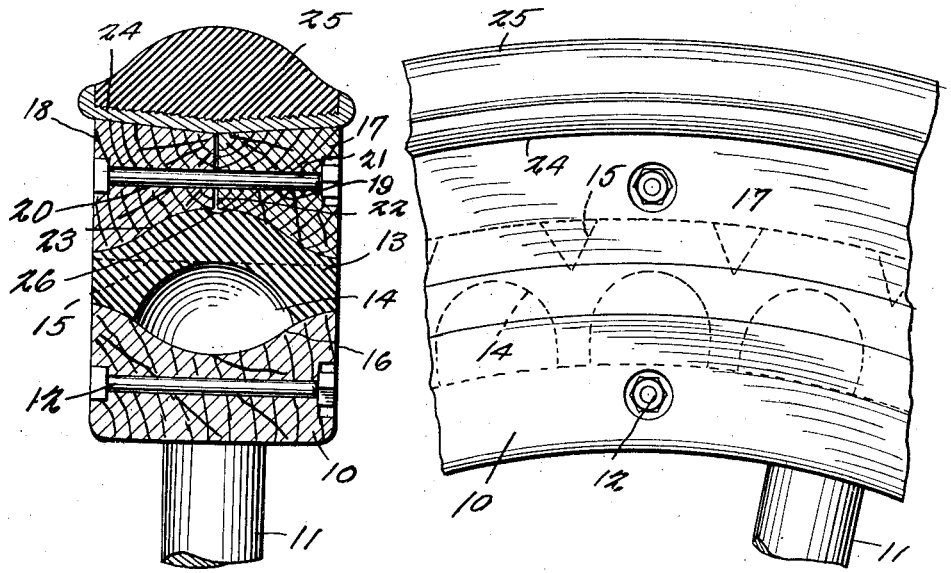
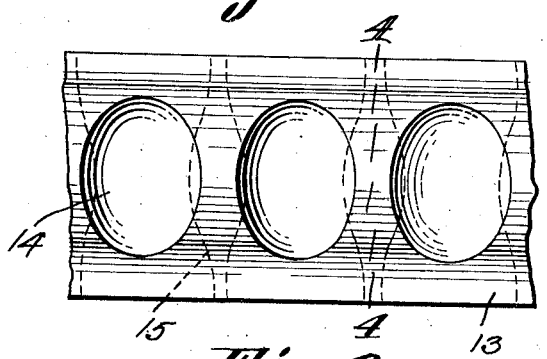
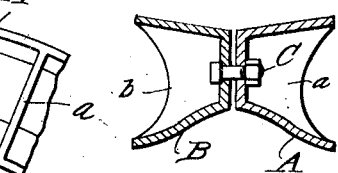

JOHN SAUL, OF JERSEY CITY, NEW JERSEY.

CUSHION-TIRE.

1,356,115.  Specification of Letters Patent.  Patented Oct. 19, 1920.

Application filed February 19, 1919. Serial No. 277,909.

*To all whom it may concern:*

Be it known that I, JOHN SAUL, a citizen of the United States of America, and resident of Jersey City, in the county of Hudson and State of New Jersey, have invented certain new and useful Improvements in Cushion-Tires, of which the following is a specification.

This invention relates to resilient tires and wheels and particularly to cushion tires, the cushion of which is interposed between the outer and inner felly members, so that the said cushioning element is protected.

An object of this invention is to produce a wheel of the character indicated in which the cushioning member consists of yieldable material, such as rubber, provided with an air cell or cells associated with novel means for attaching a tire in operative relation thereto so as to render the device adjustable to increase or diminish the pressure on the cushion or to take up lost motion, due to wear or deterioration.

A further object of this invention is to provide a cushion in which a comparatively small amount of stock is used for its manufacture, while at the same time, maintaining high efficiency as well as durability and furthermore, rendering it possible to replace segments or sections of a cushion to restore the cushioning effect of the whole cushioning member without the installation of an entirely new cushion.

A still further object of this invention is to produce a cushioning wheel of the character indicated in which the parts are retained in position and are not liable to become displaced or accidentally disassembled even though there is considerable lateral strain, such as is occasioned by side blows and shearing shocks, and avoid the employment of flanges which are now so commonly employed to prevent such lateral displacement of the cushion.

With the foregoing and other objects in view, the invention consists in the broad idea as well as in the details of construction to be set forth in the claims during the prosecution of the application, the said claims to be of such scope as to give protection commensurate with the inventive act in view of the state of the art when the said invention was produced.

In describing the invention in detail, reference will be had to the accompanying drawings forming part of this specification wherein like characters denote corresponding parts in the several views, and in which—

Figure 1 illustrates a sectional view of a rim with the tire members in assembled relation to each other, a fragment of a spoke being shown in elevation;

Fig. 2 illustrates a side elevation of a fragment of a rim;

Fig. 3 illustrates an underneath plan view of the cushion;

Fig. 4 illustrates a sectional view on the line 4—4 of Fig. 3;

Fig. 5 illustrates a sectional view of a pneumatic cushion;

Fig. 6 illustrates an elevation showing the use of a metal sectional felly; and

Fig. 7 illustrates a transverse sectional view thereof.

In these drawings 10 denotes a felly, to which the spokes 11 may be connected in the usual manner and the said felly is preferably supplied with transversely disposed bolts 12 which are intended to guard against splitting of the felly 10, and such number of bolts may be employed as is warranted to accomplish the result sought.

The cushion 13 in the present embodiment of the invention consists preferably of elastic material such as rubber having a series of air cells 14 extending outwardly from the inner side and forming enlargements with the side edges thereof. It will of course be understood that the number of air cells may be increased or diminished according to the requirements in practice.

The cushion 13 is also preferably provided with a series of transversely V-shaped grooves or recesses 15 in its periphery and the said recesses 15 are staggered preferably with relation to the cells 14, the said construction being adopted in the interest of economy of production since the material requirements will be decreased and also in the interests of efficiency, since the presence of the recesses 15 increases the elasticity or cushioning action of the said cushion.

The felly 10 has a peripheral channel or concavity 16 and the inner face of the cushion conforms to the configuration of the periphery of the felly 10, so that when these members are assembled, lateral displacement of the cushion is practically impossible especially so when its distension is restricted and it is confined and held in place by the outer felly. The said outer felly in the present embodiment of the invention comprises two similar members 17 and 18 preferably made of wood (although metal may be employed) and provided with a series of transversely disposed apertures 19 and 20 respectively, the apertures of one alining with the apertures of another when they are assembled so that bolts, such as 21 may be applied to the apertures for the purpose of drawing the members together and binding them against the outer surface of the cushion and the relation of parts is such that a space 22 exists between the adjacent edges of the members to afford an adjustment to take up lost motion.

As shown in the drawings, the outer peripheral surface of the cushion is convexed as shown at 23 and the inner surfaces of the members 17 and 18 are recessed or convexed to the general configuration of the contiguous surface of the cushion and it is apparent, therefore, that as the members 17 and 18 are drawn together by the bolts, pressure on the cushion will be increased, thereby making it possible to regulate the elasticity of the cushion to a marked degree, so that even though the cushion becomes impaired, its effectiveness could be restored by increasing the compression afforded by the adjustment of the members 17 and 18. Owing to the fact that the cushion is relatively narrow at the edges as compared to the thickness of the cushion at its center, it will be seen that lateral movement of the cushion with respect to the felly 10, or lateral movement of the outer felly with relation to the cushion could only result if the shearing action were so great as to absorb the cushion and that would be occasioned only by some unusual accidental happening.

The outer or peripheral surfaces of the members 17 and 18 are preferably tapered from their outer to their inner edges to engage a tire rim 24, the inner surface of the tire rim being beveled from its transverse center to its edges on approximately the same angle as the taper of the members 17 and 18, so that there is a camming action between the rim and the members 17 and 18 which forces the said members toward the cushion when the members are drawn together. The rim 24 is of the channel type in this showing, although I do not wish to be limited with respect to its shape and it is supplied with the usual cushion tire 25.

It has been found in practice that in repairing the cushion, a segment or section of it may be removed, and it can be replaced by a section slightly longer than the removed section for the purpose of increasing the diameter of the whole cushion to its original size and save the cost of an entirely new cushion.

To prevent the material of the cushion from entering the space between the members 17 and 18, the cushion is preferably provided with a circumferential channel 26 which produces a clearance sufficient to avoid the crowding of the cushion into said space.

In Fig. 5, I have illustrated a pneumatic cushion 27 which may be substituted for the cushion 13 and any suitable means may be provided for inflating the pneumatic cushion. It is practically the same surface configuration as the cushion shown in Fig. 1 and is intended to coöperate with the outer and inner fellies in the same way.

In the forms shown in Figs. 6 and 7, the sections A and B of the sectional felly are made of metal with transversely disposed external ribs $a$ and $b$ for the purpose of strengthening the structure and transversely disposed bolts C are employed to draw the sections together.

I claim—

1. In a cushion tire, a felly having an outer concave surface, a cushion member positioned on the concaved surface, said cushion member having a convex upper surface and a plurality of cells formed in the opposite surface thereof, a sectional rim having its adjacent side faces disposed in spaced relation with each other, and having its inner surface concaved to receive the convex surface of the cushioning member, means for adjusting the sections of the sectional rim toward and away from each other, and a cushion tire supported on the rim.

2. In a cushion tire, a felly having an outer concaved surface, a cushion member having cells formed in one surface thereof and having a circumferential channel formed in the opposite surface thereof, an outer sectional felly supported on the cushioning member, means for moving the sections of the sectional felly toward each other for increasing or diminishing the resiliency of the cushion member, and a tire on the sectional felly.

3. In a cushion tire, a felly having a concaved surface, a cushion member having a series of cells formed therein, positioned on the felly, said cushion member having lateral solid enlargements engaging the felly adjacent the edges thereof, a sectional felly for holding the cushion member to the felly, and means for supporting a tire on the sectional felly.

JOHN SAUL.